United States Patent
Majnemer et al.

(10) Patent No.: US 8,914,381 B2
(45) Date of Patent: Dec. 16, 2014

(54) CORRELATION FILTER

(71) Applicant: Apple Inc., Cupertino, CA (US)

(72) Inventors: David A. Majnemer, Great Neck, NY (US); Wenguang Wang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 13/653,363

(22) Filed: Oct. 16, 2012

(65) Prior Publication Data

US 2013/0218901 A1 Aug. 22, 2013

Related U.S. Application Data

(60) Provisional application No. 61/599,930, filed on Feb. 16, 2012, provisional application No. 61/699,145, filed on Sep. 10, 2012.

(51) Int. Cl.
*G06F 17/30* (2006.01)
*G06F 3/06* (2006.01)
*G06F 3/048* (2013.01)

(52) U.S. Cl.
CPC .............. *G06F 17/30* (2013.01); *G06F 3/0647* (2013.01); *G06F 3/048* (2013.01)
USPC ...... 707/747; 707/E17.52; 707/824; 711/160; 711/162; 711/202

(58) Field of Classification Search
CPC .............. G06F 3/0647; G06F 12/0866; G06F 17/30132; G06F 17/30; G06F 3/006; G06F 3/048; G06F 3/0604; G06F 3/061; G06F 3/0611; G06F 3/068; G06F 3/0685
USPC .......... 707/747, E17.052, 824, 704, 737, 797, 707/814, E17.05, E17.002, E17.087, 707/E17.012, E17.007; 711/161, 162, 163, 711/202, 109, 112, 150, 160, 118, 142, 711/E12.019, E12.07, E12.071, E12.099, 711/E12.091, E12.103; 715/783, 764, 810
See application file for complete search history.

(56) References Cited

U.S. PATENT DOCUMENTS 4,132,989 A * 1/1979 Frosch et al. ............... 342/25 D
4,292,634 A * 9/1981 Frosch et al. ............... 342/25 A
(Continued)

FOREIGN PATENT DOCUMENTS

WO WO 2007/031696 A1 3/2007

OTHER PUBLICATIONS

Yi Li ; Zhiyan Wang ; Haizan Zeng—"Correlation filter: an accurate approach to detect and locate low contrast character strings in complex table environment"—Pattern Analysis and Machine Intelligence, IEEE Transactions on (V:26, I: 2)—Dec. 2004—pp. 1639-1644.*

(Continued)

*Primary Examiner* — Anh Ly
(74) *Attorney, Agent, or Firm* — Blakely, Sokoloff, Taylor & Zafman LLP

(57) ABSTRACT

In one embodiment, the correlation filter can use one of several data structure to track each migration unit and reject successive accesses within a period of time to each migration unit. In one embodiment, the correlation filter uses a space efficient data structure, such as a hash indexed correlation array to store the address of referenced migration units, and to filter accesses to a single migration unit that are correlated accesses resulting from multiple accesses to the same migration unit during a sequential I/O stream. In one embodiment, the correlation array contains a global timeout, which resets each element to a default value, clearing all store migration unit address values from the correlation array. In one embodiment, each element of the migration array can time-out separately.

22 Claims, 9 Drawing Sheets

(56) References Cited

U.S. PATENT DOCUMENTS

| | | | | |
|---|---|---|---|---|
| 5,059,318 | A | * | 10/1991 | Benesi .......................... 210/227 |
| 6,598,134 | B2 | * | 7/2003 | Ofek et al. .................... 711/162 |
| 6,631,017 | B2 | * | 10/2003 | Khoury ........................ 359/559 |
| 6,804,763 | B1 | | 10/2004 | Stockdale et al. |
| 6,978,259 | B1 | * | 12/2005 | Anderson et al. ............... 706/19 |
| 7,103,740 | B1 | | 9/2006 | Colgrove et al. |
| 7,555,575 | B2 | | 6/2009 | Kaneda |
| 7,590,671 | B2 | | 9/2009 | Achiwa |
| 7,788,220 | B1 | | 8/2010 | Auchmoody et al. |
| 8,583,966 | B2 | * | 11/2013 | Gadsing ........................ 714/42 |
| 8,745,523 | B2 | * | 6/2014 | McInerney et al. ............ 715/783 |
| 2001/0014886 | A1 | * | 8/2001 | Ross et al. ..................... 706/45 |
| 2001/0051937 | A1 | * | 12/2001 | Ross et al. ..................... 706/47 |
| 2003/0056058 | A1 | * | 3/2003 | Veitch ........................... 711/112 |
| 2004/0049553 | A1 | * | 3/2004 | Iwamura et al. .............. 709/213 |
| 2006/0069876 | A1 | * | 3/2006 | Bansal et al. .................. 711/134 |
| 2006/0195508 | A1 | * | 8/2006 | Bernardin et al. ............. 709/203 |
| 2007/0168398 | A1 | * | 7/2007 | Miroshnichenko et al. .. 707/200 |
| 2011/0022601 | A1 | * | 1/2011 | Elrom et al. ................... 707/747 |
| 2011/0082967 | A1 | | 4/2011 | Deshkar et al. |
| 2011/0231362 | A1 | | 9/2011 | Attarde et al. |
| 2011/0276744 | A1 | * | 11/2011 | Sengupta et al. .............. 711/103 |
| 2011/0276781 | A1 | * | 11/2011 | Sengupta et al. .............. 711/216 |
| 2011/0283045 | A1 | * | 11/2011 | Krishnan et al. .............. 711/102 |
| 2011/0307447 | A1 | * | 12/2011 | Sabaa et al. ................... 707/637 |
| 2011/0320754 | A1 | * | 12/2011 | Ichikawa et al. .............. 711/165 |
| 2012/0066389 | A1 | * | 3/2012 | Hegde et al. .................. 709/226 |
| 2012/0084523 | A1 | * | 4/2012 | Littlefield et al. ............ 711/162 |
| 2012/0101995 | A1 | | 4/2012 | Agetsuma et al. |
| 2012/0137066 | A1 | | 5/2012 | Nolterieke et al. |
| 2012/0239859 | A1 | * | 9/2012 | Lary et al. .................... 711/103 |
| 2012/0278662 | A1 | * | 11/2012 | Gadsing ........................ 714/42 |
| 2013/0042052 | A1 | * | 2/2013 | Colgrove et al. ............. 711/103 |
| 2013/0063307 | A1 | * | 3/2013 | Krasner et al. ................ 342/387 |
| 2013/0218901 | A1 | * | 8/2013 | Majnemer et al. ............ 707/747 |
| 2013/0219139 | A1 | * | 8/2013 | Wang et al. ................... 711/162 |

OTHER PUBLICATIONS

Siew Chin Chong, Andrew Beng Jin Teoh, David Chek Ling Ngo—"Iris Authentication Using Privatized Advanced Correlation Filter"—Advances in Biometrics—Computer Science vol. 3832, 2005, pp. 382-388.*

PCT International Search Report and Written Opinion for corresponding International Application No. PCT/US2013/025224, mailing date Jul. 15, 2013, 8 pages.

PCT International Search Report and Written Opinion for corresponding International Application No. PCT/US2013/025597, mailing date Jul. 15, 2013, 8 pages.

Jiang, Song et al., "CLOCK-Pro: An Effective improvement of the CLOCK Replacement", In Proceedings of USENIX Annual Conference, (2005), 14 pages.

PCT International Search Report and the Written Opinion of the International Searching Authority for PCT/US2013/055740, mailed Nov. 11, 2013.

Hannes Payer et al.: "Combo Drive: Optimizing Cost and Performance in a Heterogeneous Storage Device", Mar. 7, 2009.

Feng Chan et al.: "Hystor: Making the Best use of Solid State Drives in High Performance Storage Systems", Supercomputing, ACM, 2 Penn Plaza, Suite 701 New York, NY 10121-0701, May 31, 2011, pp. 22-32, XP058003711.

* cited by examiner

CORRELATION FILTER

CROSS-REFERENCE

The present application is related to, and claims the benefit of provisional application Ser. No. 61/599,930 filed Feb. 16, 2012, and provisional application Ser. No. 61/699,145, filed Sep. 10, 2012, both of which are incorporated herein by reference. The present application is also related to application Ser. No. 61/599,927 filed on Feb. 16, 2012, which is incorporated herein by reference.

BACKGROUND OF THE DISCLOSURE

In a composite disk system, a large, slow, and inexpensive magnetic hard drive can be combined with a small, fast but expensive, storage device, such as a solid state drive to form a logical volume. This can provide the advantage of fast access through the solid-state drive (SSD) while providing the large capacity of the magnetic hard disk drive (HDD). In a sense, the relatively fast drive can function as a cache for data on the larger, slower drive. Various algorithms and methods for managing such composite disks are possible, but generally, a composite disk management algorithm will attempt to identify data on the slower drive that is frequently accessed and move that data to the faster drive. Once the faster drive reaches maximum capacity, each subsequent migration of data requires a data eviction back to the slower drive. Accordingly, the algorithm will use some method to select and evict data from the faster drive before adding newly referenced data from the slower drive. Under certain use cases, however, the frequently accessed data block detection method for the slower drive can select data blocks that appear to be frequently accessed, but in fact are rarely accessed again.

SUMMARY OF THE DESCRIPTION

In one embodiment, a method for managing access to a fast non-volatile storage device, such as a solid state device, and a slower non-volatile storage device, such as a magnetic hard drive, can include maintaining a data structure that indicates whether or not units or blocks in the slower storage device, such as the HDD, have been recently accessed, or have received at least a predetermined number of recent accesses. In on embodiment, multiple blocks of data are stored in a single migration unit to reduce I/O overhead during data migration, and a correlation filter is used to filter correlated data references from the input of the migration processor.

In one embodiment, the correlation filter can use one of several data structures to track each migration unit and reject successive accesses within a period of time to each migration unit. In one embodiment, the correlation filter uses a space efficient data structure, such as a hash indexed correlation array to store the address of referenced migration units, and to filter accesses to a single migration unit that are correlated accesses resulting from multiple accesses to the same migration unit during a sequential I/O stream. In one embodiment, the correlation array contains a global access timeout, which resets each element to a default value, clearing all store migration unit address values from the correlation array. In one embodiment, each element of the migration array can time-out separately.

Other features of the present invention will be apparent from the accompanying drawings and from the detailed description, which follows.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements, and in which.

DETAILED DESCRIPTION

Approaches to improving the management of a composite, non-volatile data storage device are described. Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow can be performed by processing logic comprising hardware (e.g. circuitry, dedicated logic, etc.), software (as instructions on a non-transitory machine-readable storage medium), or a combination of both. Although some of the processes are described below in terms of sequential operations, it should be appreciated that some of the operations described may be performed in a different order. Moreover, some operations may be performed in parallel rather than sequentially.

Figure 1:
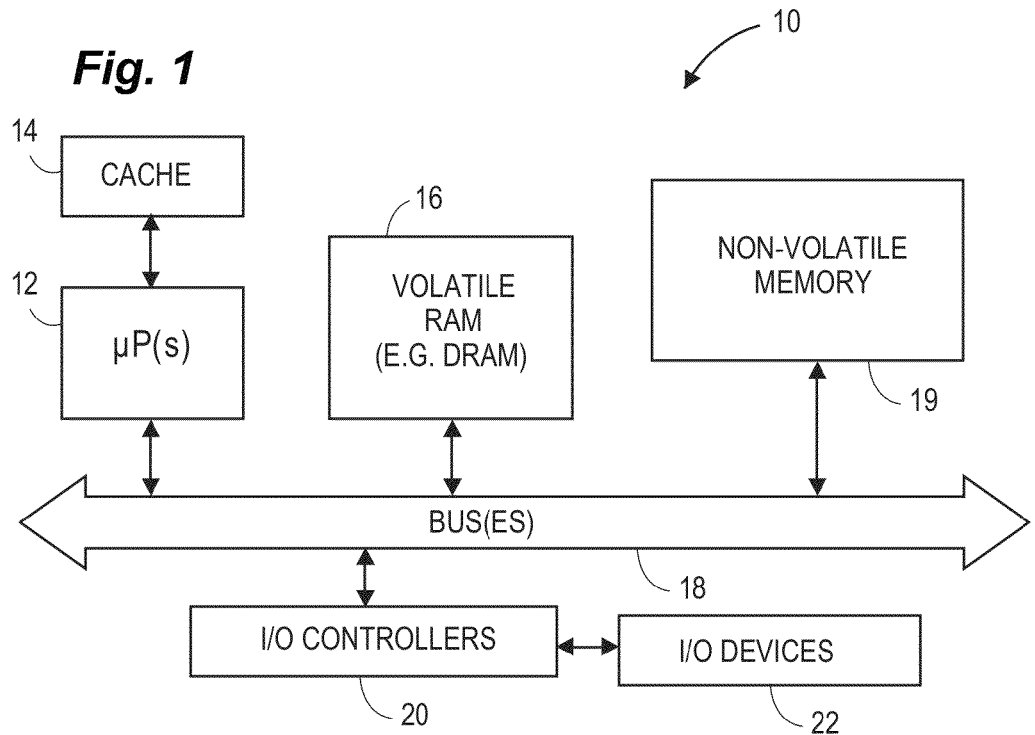
FIG. 1 shows an example of a data processing system, which may be employed with an embodiment of the present invention.

FIG. 1 shows an example of a computing system 10, which is a form of a data processing system, which can be employed with one or more embodiments described herein. The system 10 can be a desktop computer system or a laptop computer system or a Smartphone, or some other electronic devices or consumer electronic devices. The system 10 can include one or more microprocessors or other logic units 12 coupled to an optional cache 14 which in one embodiment can be SRAM, as known in the art. The one or more microprocessors 12 are coupled to the rest of the system through one or more buses 18, which couple the one or more microprocessors 12 to main memory, which can be volatile RAM 16. In one embodiment, volatile RAM can be the conventional DRAM used in computer systems, where the DRAM is coupled through the bus to the rest of the components in the system 10. The system 10 can also include one or more input/output controllers 20, which couple one or more input/output devices 22 to the rest of the system through the one or more buses 18. The system 10 also includes a non-volatile memory 19 which can be a composite disk, such as a combination of flash memory, which is a form of a solid state, drive and a conventional magnetic hard drive.

Figure 2:
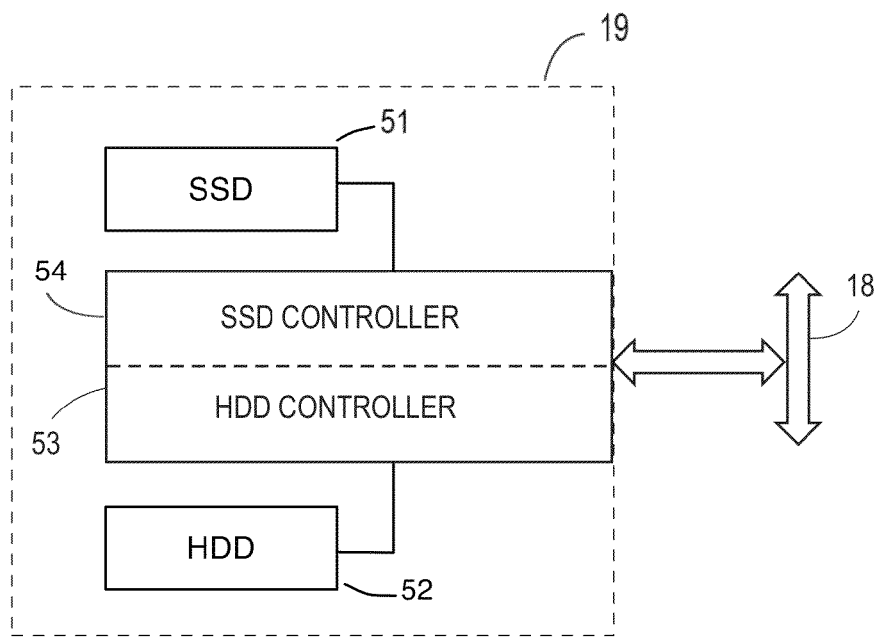
FIG. 2 shows an example of a composite non-volatile memory according to one embodiment of the present invention.

FIG. 2 shows an example of a composite disk according to one embodiment. The non-volatile memory 19 includes a solid state drive 51 and a magnetic hard drive 52 which can be treated as a single logical volume, or block device by a file system and an operating system and are controlled by one or more controllers, such as controller 53 which includes a solid state drive controller, and controller 54 which includes a hard disk drive controller. The one or more controllers couple the composite drive shown in FIG. 2 to the rest of the components in system 10 through the bus 18. It will be appreciated that flash memory is one form of a fast non-volatile storage device and that other fast storage devices can alternatively be used in conjunction with a slower storage device, which can be a conventional magnetic hard drive or other non-volatile storage devices which have a higher storage volume than, but are slower than the faster storage device. It will be understood that in this description a reference to SSD or HDD will be construed to mean the faster and the slower non-volatile storage devices and will not be construed as being limited to, or specific to any storage device technology.

Figure 3:
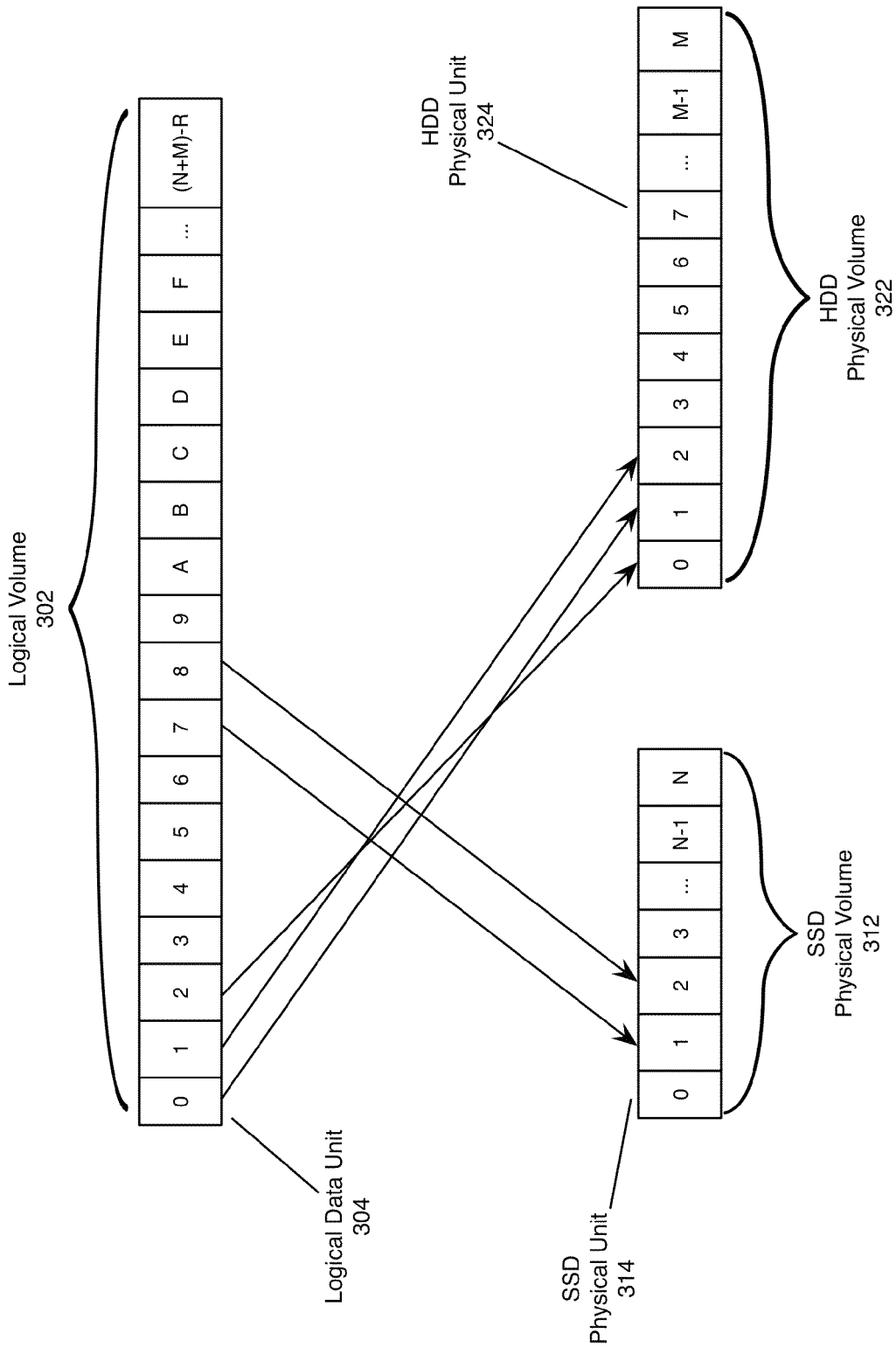
FIG. 3 is a block diagram illustrating one embodiment of a composite storage mapping arrangement for logical to physical volume mapping.

FIG. 3 shows a block diagram of an example logical volume according to one embodiment of the invention. A logical volume 302 allows one or more physical storage volumes to appear as a single logical device to an operating system. In one embodiment, the logical volume 302 contains multiple data units 304, which can map to a physical unit on a storage device. In one embodiment, a logical volume can be used to interface with a composite disk, such as the composite disk illustrated in FIG. 2. In such embodiment, a fast non-volatile storage device (e.g. SSD physical volume 312) is coupled with a slower, larger capacity non-volatile storage device (e.g. HDD physical volume 322). In such example, the multiple logical data units 304 of the logical volume can map to an SSD physical unit 314 or an HDD physical unit 324.

In one embodiment, a logical data unit 304 on the logical volume can map freely between physical units on the one or more physical drives, presenting a contiguous address space between non-contiguous physical units on the one or more physical volumes. In a composite storage device utilizing a fast storage component, migrating physical units from the slower storage component to the faster storage component can realize improved system performance when those physical units are accessed frequently. To improve input-output (I/O) performance when migrating data units between physical volumes of the composite disk, multiple data blocks are migrated as a migration unit when data is transferred between drives.

Figure 4:
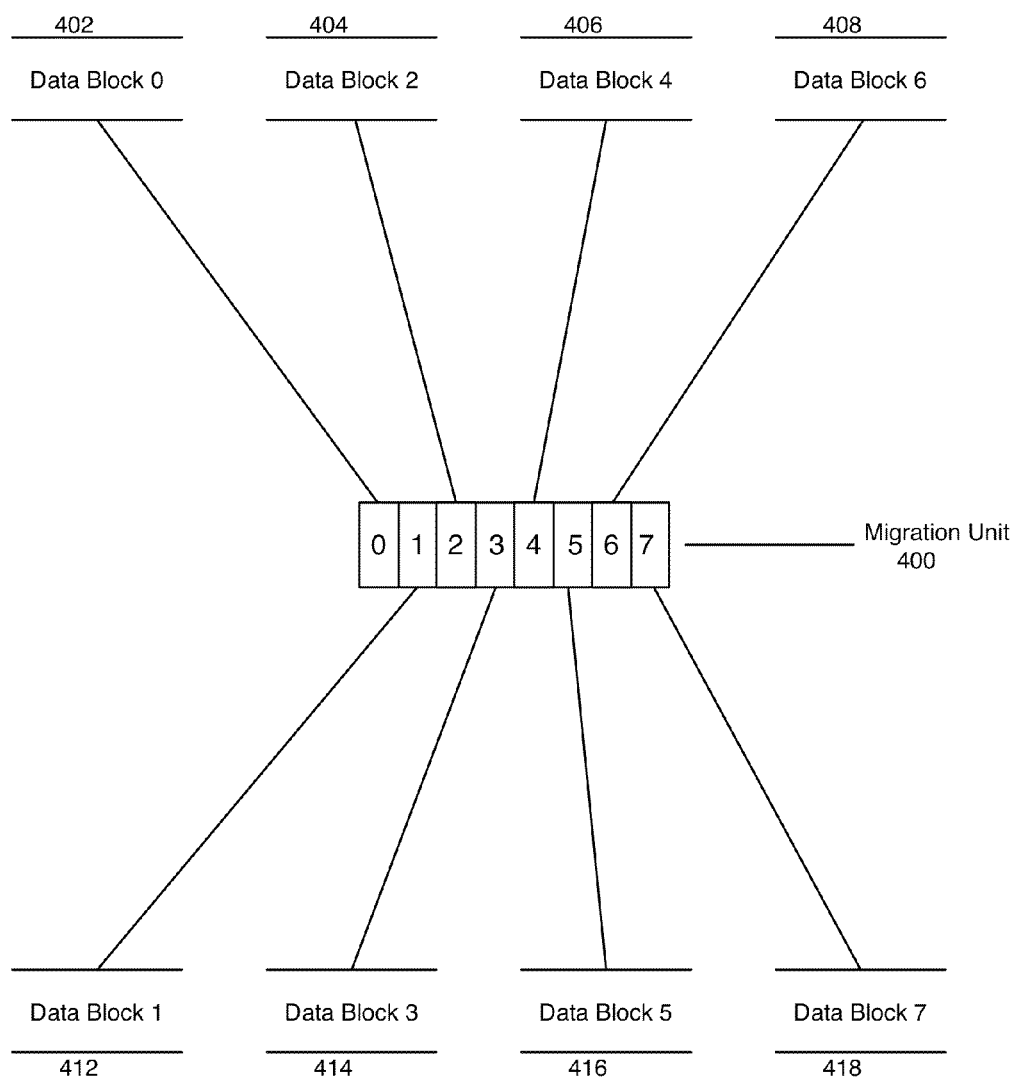
FIG. 4 is a block diagram illustrating one embodiment of a migration unit that contains multiple data unit blocks.

FIG. 4 presents a block diagram illustrating one embodiment of such a migration unit that contains multiple data unit blocks. Multiple data block sizes and groupings can be used to tune system performance and efficiency. For example, in one embodiment, eight data blocks (e.g. data block 402 through data block 418) of four kilobytes each can be stored in a thirty-two kilobyte migration unit (e.g. migration unit 400). In one embodiment, as migration unit size increases, an increase in the efficiency of the I/O operations can be realized between the relatively slower and larger physical volume and relatively smaller and faster physical volume. For example, in one embodiment, a 128-kilobyte migration unit can contain thirty-two data blocks of 4 kilobytes each. As migration unit size increases, some degree of data granularity can be lost, and the composite storage device migration management system may not be able to target the most accessed data blocks without migrating a larger number of spatially local data blocks.

Figure 5:
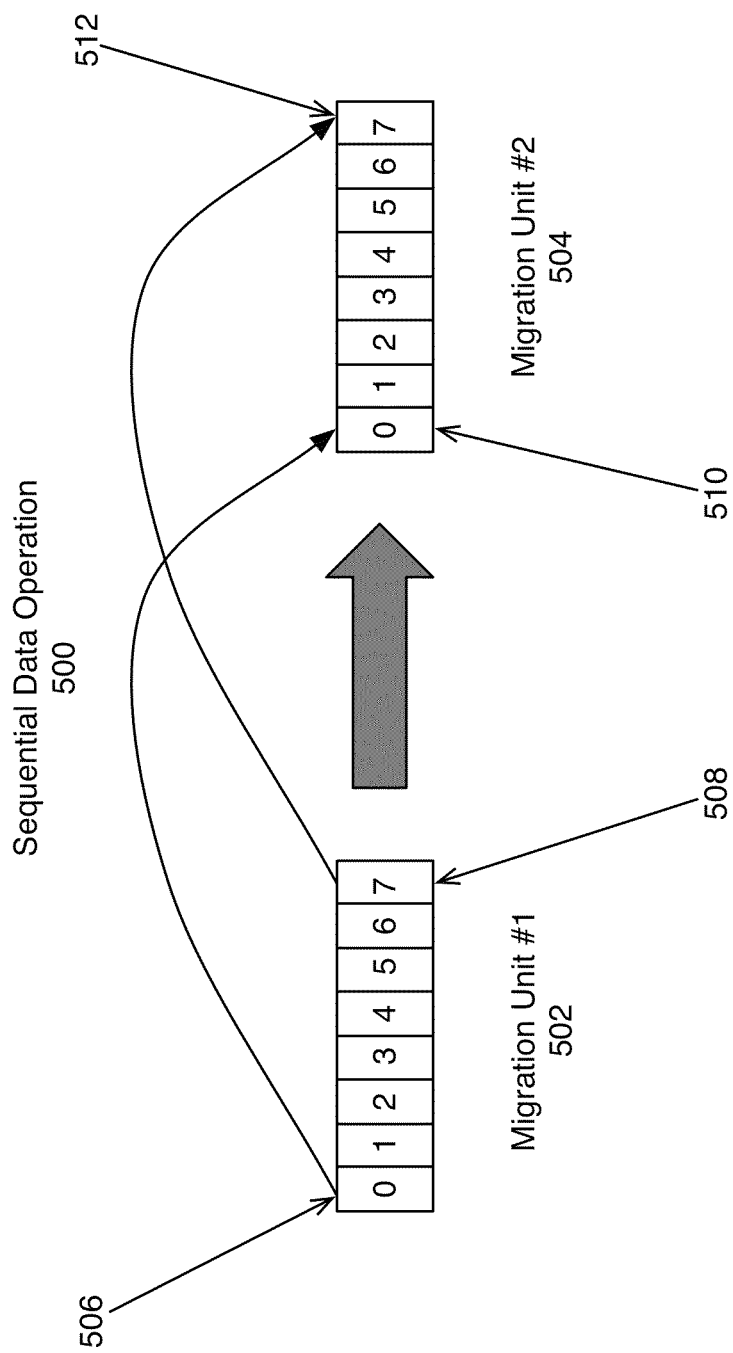
FIG. 5 is a block diagram illustrating data block indexing during a sequential data operation on the composite non-volatile storage.

The issue of spatial locality influencing the migration management system can be illustrated in an example shown in FIG. 5. FIG. 5 is a block diagram illustrating data block indexing during a sequential data operation on the composite non-volatile storage. In this scenario, a sequential data operation 500 is taking place on, for example, the HDD device of the composite data storage 19 of FIG. 2. Data stored on one or more migration units, including a first migration unit 502, is sequentially streamed to a second location, which includes, at least in part, a second migration unit 504. In the case of such sequential operations, the spatially local blocks of the first migration unit, from the first block 506 (e.g. block 0 of the first migration unit 502) to the last block 508 (e.g. block 7 of the first migration unit 502) is copied to the second migration unit 510, to occupy storage space ranging from the first block of the second migration unit 510 (e.g. block 0 of the second migration unit 510) to the last block of the migration unit 512 (e.g. block 7 of the second migration unit 512).

During such operation, each block will register as a recent access upon the first migration unit 502 and second migration unit 504. These multiple accesses to the same migration unit within a short time are called correlated references, and they do not necessarily mean these migration unit are likely to be accessed frequently in the near future. In one embodiment, each recent access to a migration unit on the larger and slower storage device (e.g. HDD) will increase the probability that the migration unit in question will be promoted to, or migrated to the faster storage device (e.g. SSD). Over time, such one time sequential operations can result in a faster storage device that has multiple data blocks that are not likely to be accessed frequently, which can hamper the performance realized from the composite device.

Figure 6:
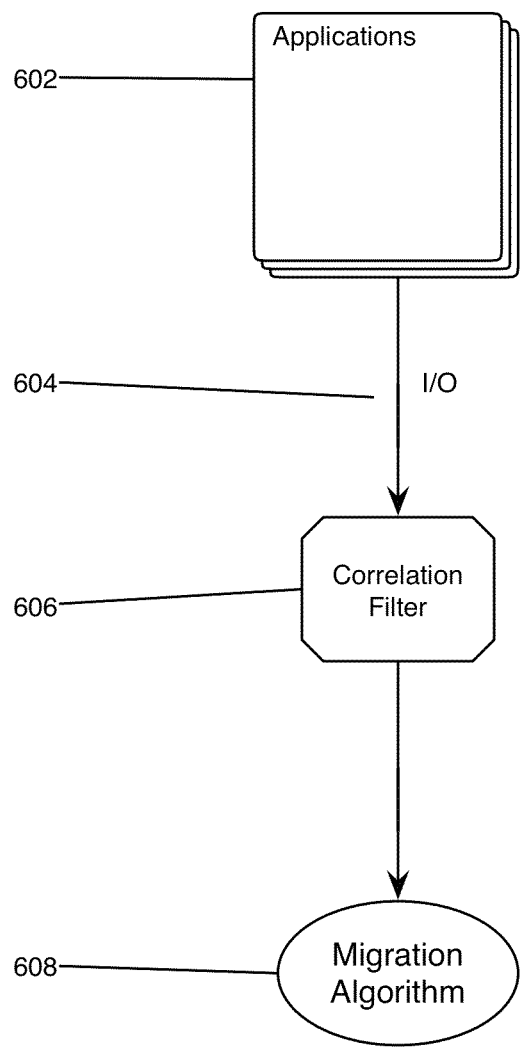
FIG. 6 is a block diagram of one embodiment of a correlation filter placed before a migration algorithm to reduce false positive determinations.

In one embodiment, this issue is addressed via the use of a correlation filter. FIG. 6 is a block diagram of one embodiment of a correlation filter placed before a migration algorithm to reduce false positive determinations. Applications 602 having access to the storage device can trigger input-output operations 604 to a composite storage device. In one embodiment, the I/O operations 604 can be monitored by an I/O monitor thread 700, which is discussed in FIG. 7 below.

The I/O monitor thread, or some alternative I/O monitor or controller, can filter the I/O operations, or I/O operations stream, through a Correlation Filter 606 before sending those operations to be processed by a migration algorithm 608. The Correlation Filter 606 can use various techniques to identify and eliminate repetitive I/O operations that are correlated to a single I/O operation resulting from a single sequential I/O stream. Such operations can still be sent to the storage device to be performed, but correlated operations can be filtered from the input to the migration algorithm, which, in one embodiment, determines which migration units will be migrated to the faster storage from the slower storage in the composite storage device. For additional discussion of various migration algorithms for a composite data storage device, see "Data Migration For Composite Non-Volatile Storage Device," Ser. Nos. 61/599,930 and 61/599,927, which have been incorporated by reference above.

Figure 7:
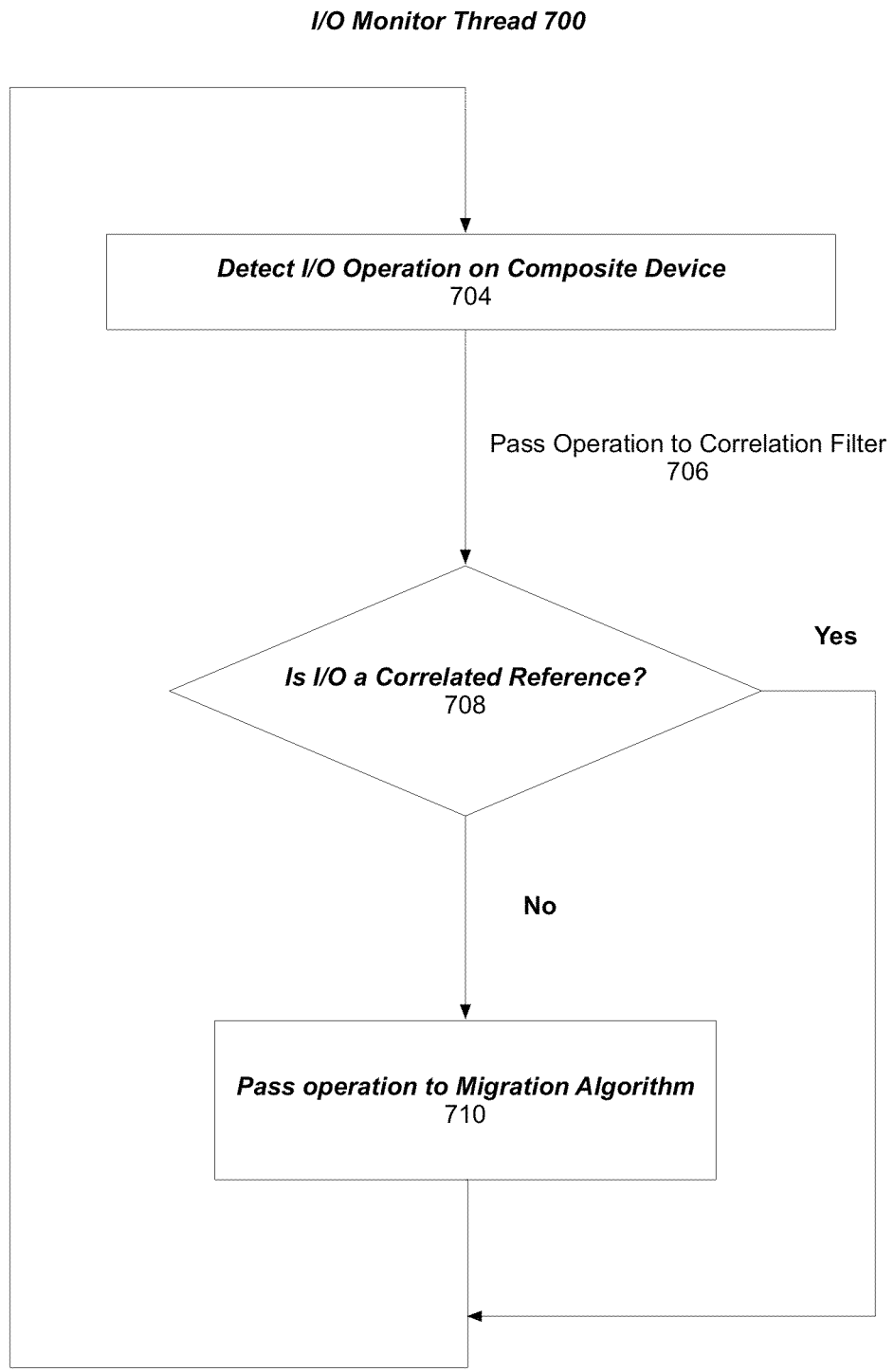
FIG. 7 is a flowchart, which depicts an I/O monitor thread according to at least one embodiment of the present invention.

FIG. 7 is a flowchart, which depicts an I/O monitor thread according to at least one embodiment of the present invention. The I/O monitor thread can operate as part of an operating system, or as part of a composite storage device driver, or is otherwise positioned to perform operation 704 to detect one or more input-output operations on, or directed to, a composite storage device. The I/O monitor thread can perform an operation 706 to pass the I/O operation, or I/O operation stream to determine, in operation 708, whether the I/O operation is a Correlated Reference, or a follow-on operation resulting from a single sequential operation across multiple blocks of a single migration unit. One embodiment of operation 708 is depicted in further detail in FIG. 8 below. If the I/O operation, or operation contains one or more Correlated References, those references will be not be sent to the migration algorithm. In one embodiment, this effectively counts sequential operations traversing a migration unit as a single operation for migration analysis, and does not use the correlated operations as additional access for migration analysis purposes.

Figure 8:
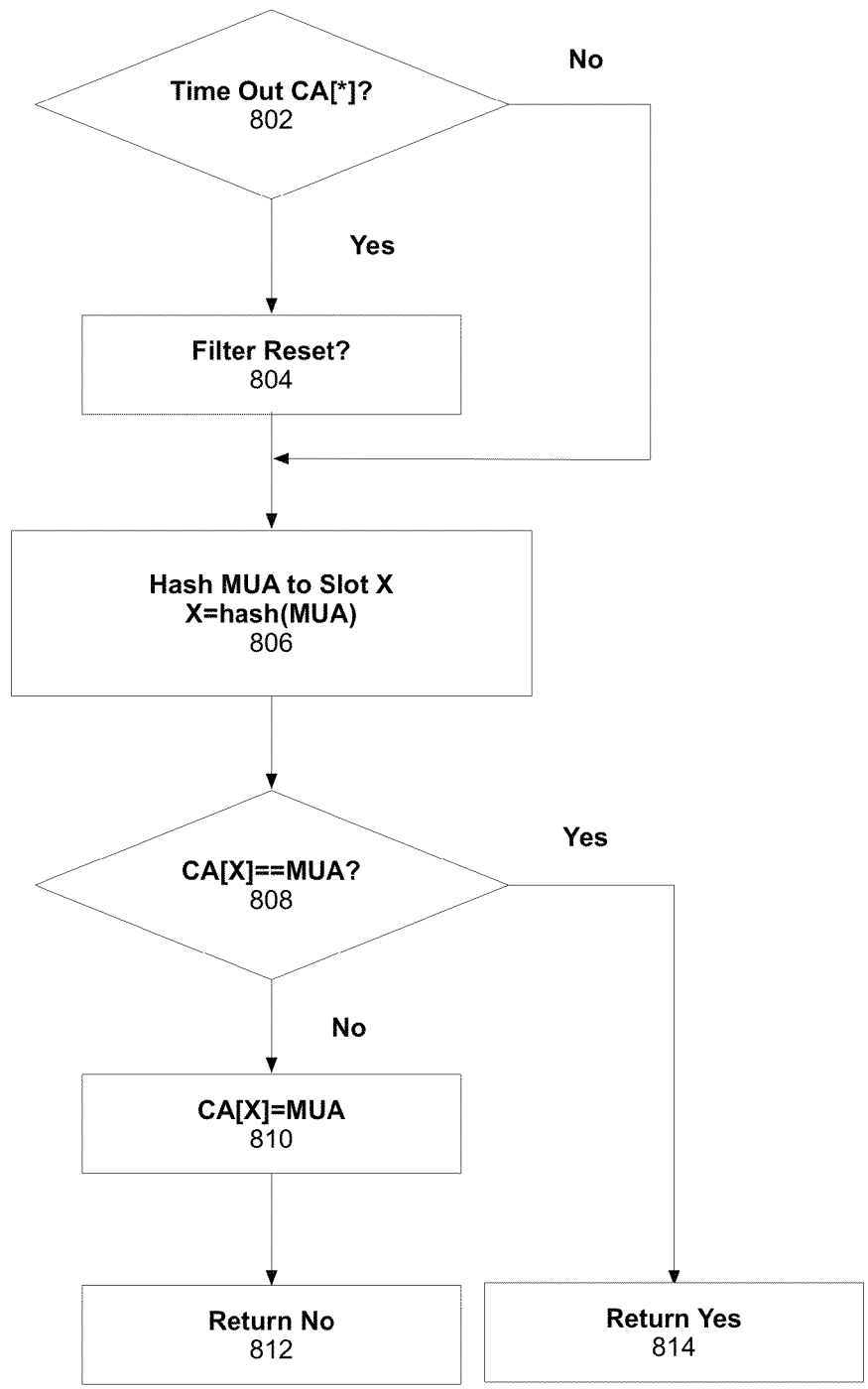
FIG. 8 is a flowchart, which depicts a correlation filter method according to at least one embodiment of the present invention.

FIG. 8 is a flowchart depicting a correlation filter method according to at least one embodiment of the present invention. In FIG. 8, an example I/O Correlation Filter 800 is illustrated which uses a timeout counter and a correlation filter data structure to implement one embodiment of a Correlation Filter. In operation 802, the timeout counter is assessed to determine whether to reset a correlation filter data structure, which in one embodiment, can be the Correlation Array 900 discussed in FIG. 9 below. The global timeout can be tuned to take into account the access time for one or more physical volumes in the composite data storage device. Tuning the timeout for the physical volume access time allows the first action, or group of actions to register with the migration algorithm, while additional I/O operations on the migration unit that are correlated with the initial I/O operation or I/O stream are filtered from the view of the migration algorithm. In one embodiment, after a certain timeout time, the correlation filter data structure is reset and subsequent operations on that migration unit will be reported to the migration algorithm.

Returning to FIG. 8, in one embodiment, if in operation 802 the timeout counter has not expired, the correlation filter data structure reset is bypassed. Alternatively, if the timeout counter has expired, a filter-reset operation 804 occurs and each element of the correlation filter data structure is reset to a default value. The I/O Correlation Filter, for each action on a migration unit, will perform an operation 806 on the address of the migration unit (e.g. the Migration Unit Address) that uses one or more hash functions to compute a hash value (e.g. X) of the Migration Unit Address (MUA). In one embodiment, the hash value of the MUA can be stored in an element of the correlation filter data structure.

It is to be noted, however, that the correlation filter can use one of several methods to track correlated references to Migration Units, and using the hash values of the Migration Unit Address is but one possible approach. In one embodiment, a correlation filter can be constructed such that the address of one or more Migration Units is stored in either an array, a linked list, an ordered tree, or some other ordered or indexed, data structure; the MUA of each successive I/O operation can then be compared against the elements of this data structure for some period related to the access value of the slower physical volume of the composite storage device. Additionally, other probabilistic data structures, such as a Bloom filter, or counting Bloom filter can be used. An embodiment using the hash value of the address of the migration unit allows a probabilistic access determination to be made for each migration unit without requiring the large amount memory usage that would be required if each migration unit were tracked explicitly. Furthermore, any number or variety of hashing algorithms can be used, and embodiments are not limited to, or specific to, any specific hash algorithm.

In one embodiment, the I/O Correlation Filter 800 uses a multi-element correlation data structure with an element, or "bucket" for approximately the number of I/O streams the filter will track. The hashing algorithm will, with a high degree of probability, generate a different hash value for each of the Migration Units addressed. Accordingly, the I/O Correlation Filter 800 can track approximately as many simultaneous I/O streams as available buckets to store the hash values. In one embodiment, the number of buckets can be static, while in an alternate embodiment the number of buckets can grow or shrink dynamically. In one embodiment, thirty-two buckets are used as a default number of buckets. The hash value of the MUA can be stored in some form of non-transitory machine-readable memory, and the I/O Correlation Filter 800 can perform an operation 808, which indexes the correlation filter data structure using the hash value calculated from the MUA, and compares the contents of that element of the correlation filter data structure with the Migration Unit Address.

In one embodiment, the correlation filter data structure is initialized and periodically reset to some default value that is not a valid address of a Migration Unit (e.g. a negative value, such as "−1"). If the value stored in the correlation filter index during operation 808 matches the default value, this can indicate that an I/O operation has not occurred on the Migration Unit having an address value equal to the MUA, at least since the last correlation filter data structure reset. Accordingly, operation 810 occurs which stores the value of the MUA in the correlation filter data structure at the index defined by the hash of the MUA. The I/O Correlation Filter then performs an operation 812, which returns a "False," "No," or otherwise negative value that indicates that the I/O operation, or I/O stream is not, or did not contain, a correlated reference. During the next reference to the migration unit, the operation 808 comparing the element indexed by the hash of the MUA will find a value equal to the MUA stored in the correlation data structure. In this case, the I/O correlation filter 800 will return "Yes," "True," or some other affirmative value which indicates that the I/O operation, or I/O stream contains a reference to a Migration Unit that is correlated with a previous reference. Accordingly, an I/O monitor thread, such as the I/O monitor thread 700 of FIG. 7, would not pass this operation to the migration algorithm (e.g. Migration Algorithm 606 of FIG. 6).

Figure 9A:
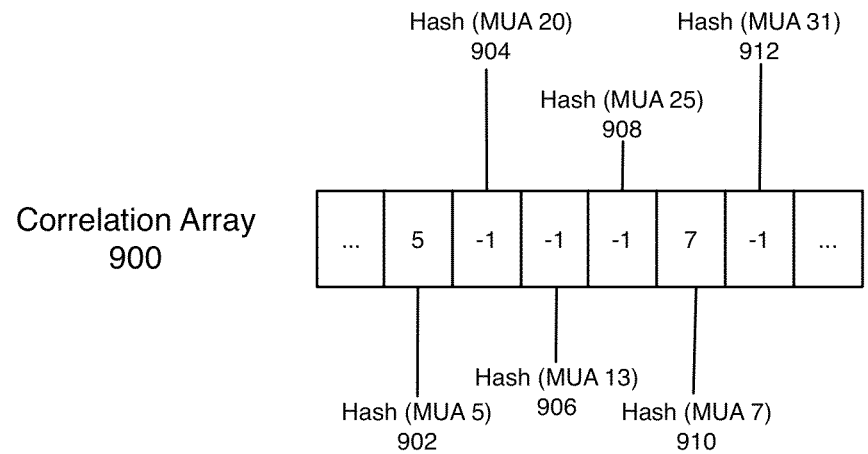
FIG. 9A is a block diagram of a one embodiment of a correlation filter correlation array.

The I/O Correlation Filter 800 of FIG. 8 can use one of several searchable, ordered or indexed data structures to track Migration Unit correlated references. In one embodiment, an array structure, such as Correlation Array 900 is FIG. 9A is used. The Correlation Array 900 can, in a space efficient manner, probabilistically track access to Migration Units and filter repetitive, correlated references to the same migration unit that occur within a certain period of time. The time period in which access to a Migration Unit will be tracked is a period analogous to, or related to, the access time of one or more physical volumes in the composite storage device. For example, in one embodiment, the resetTimeout is calculated as:

$$resetTimeout = \left(\frac{Throughput_{HDD}}{MigrationUnitSize} + SeekTime_{HDD}\right) * NumberofBuckets$$

In one embodiment, each bucket of the Correlation Array 900 is initialized to, and reset to, a default value such as, for example, "−1." In one embodiment, space efficiency is realized using a hash of the Migration Unit Address and using the hash value as an index into a "bucket," or element of the Correlation Array 900, where the MUA is stored. For example, the hash of the Migration Unit at address five is used to index bucket 902 in the Correlation Array 900. When that migration unit is accessed, the hash of the MUA can resolve to bucket 902 where the MUA value of five is stored in the Correlation Array 900. The index location of the other buckets in the Correlation Array 900 can correspond to the hash values that would be calculated from the address of the other Migration Units. For example, and for illustrative purposes only, bucket 904 can be indexed by the hash of migration unit at address twenty, bucket 906 can be indexed by the hash of the migration unit at address thirteen, the hash of the MUA value of twenty-five can resolve to bucket 908, and the hash of the MUA value of thirty-one can resolve to bucket 912. In this example, bucket 904, through bucket 908, and bucket 912 have not been accessed at least since the last reset, so those buckets store the default value. Bucket 910, however, in this example, corresponds to the index defined by the hash value of the MUA value of seven, and the bucket at this index contains the value of the MUA, which indicates that Migration Unit has been accessed, at least since the last reset.

Figure 9B:
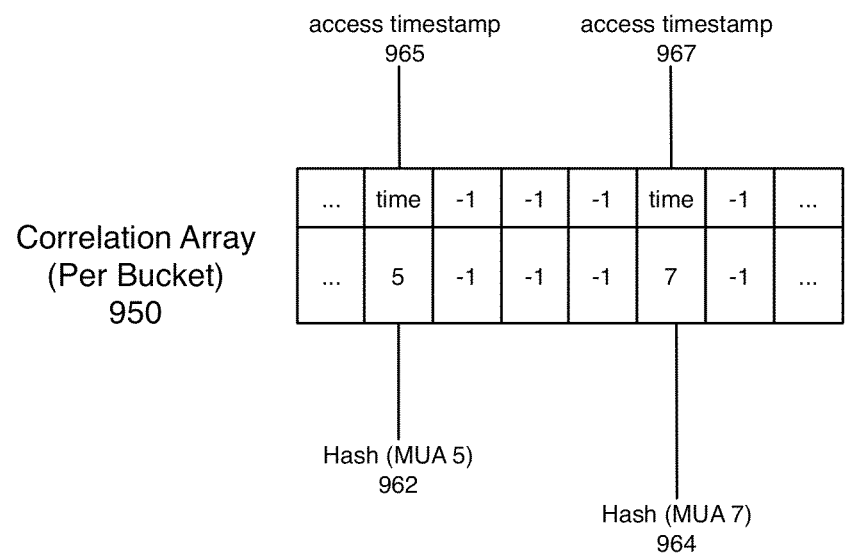
FIG. 9B is a block diagram of a one embodiment of a correlation filter correlation array with a per bucket access timestamp.

FIG. 9B demonstrates a more complex form of the Correlation Array 900 that can be used in one embodiment. In one embodiment, a Correlation Array with a per-bucket timeout 950 can be used, where buckets that are used to track accessed Migration Units, such as, for example, bucket 962 and bucket 964, can also store a timestamp, such as MUA access time 965 and MUA access time 967. This timestamp can track the time in which the bucket is updated to store the Migration Unit access information. Tracking bucket update times can improve the effectiveness of the correlation filter by increasing the granularity of the timeout of each bucket, instead of resetting all of the buckets at once.

Figure 10:
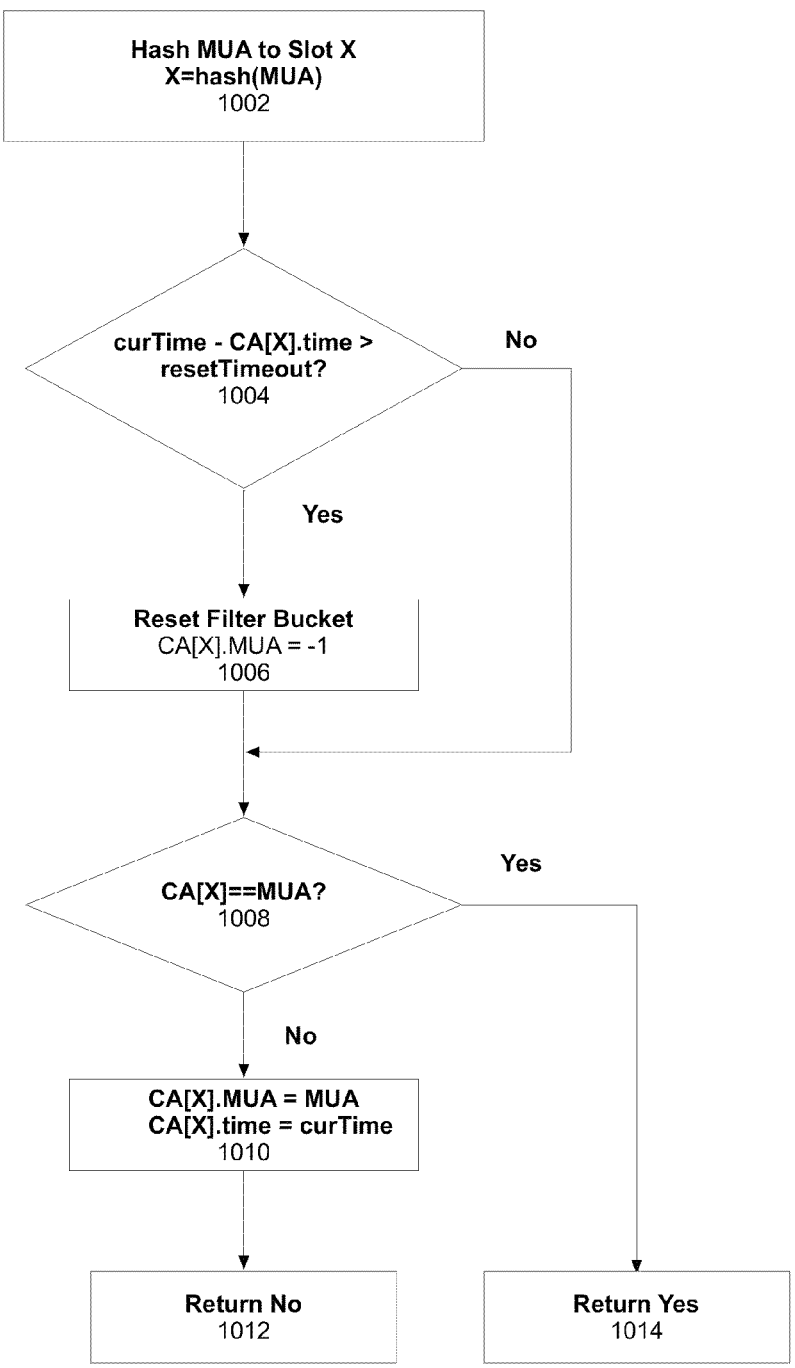
FIG. 10 is a flowchart, which depicts an advanced correlation filter method according to at least one embodiment of the present invention.

FIG. 10 is a flow chart which illustrates one embodiment of an I/O filter with a Per Bucket Reset 1000 which can utilize the Correlation Array with Per Bucket Timeout 950 of FIG. 9B. In one embodiment, in operation 1002, the hash of the MUA value is used to generate an index which can be used to select a bucket in the Correlation Array 950 of FIG. 9B. In operation 1004, the current time is subtracted from the timestamp stored in the relevant bucket to assess whether that particular bucket should be reset to the default value. If the timeout value has been reached, that particular bucket, as opposed to each bucket in the correlation array, is reset to a default value in operation 1006; otherwise, the reset is bypassed. If it is determined that the bucket stores the MUA value in question, and if the bucket has not been reset, operation 1008 will indicate whether the access to that particular Migration Unit is a new recent access, or an access that is correlated to a previous access on the Migration Unit. A correlated access is detected in operation 1008 if the stored MUA value equals the current MUA value, and operation 1014 indicates an affirmative value indicating a correlated access that should not be reported to the migration algorithm. Otherwise, in operation 1010, if a default or reset value is detected, or the value in the bucket otherwise does not equal to the queried MUA, such as, for example, if two MUA values correspond to the same hash value, the queried MUA value can be stored in the bucket, along with the value's access timestamp. Subsequently, in operation 1012, a negative response can be returned, indicating that the I/O access in question is not a correlated access, and can be reported to the migration algorithm.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A non-transitory computer-readable storage medium with instructions stored therein, the instructions, when executed by a processor, cause the processor to perform operations comprising:
    detecting an input-output operation on a logical volume of a composite data storage system;
    filtering, by a processor, the operation with a correlation filter to determine if the operation includes a reference to a migration unit that is correlated with a previous reference to the migration unit, the migration unit comprising a plurality of physical data storage units, wherein the filtering comprises computing a hash of an address of the migration unit, reading a value in a data structure at an index defined by the hash, and setting the value to the address when the value is not equal to the address; and
    passing the operation to a migration algorithm when the operation is not a correlated reference.

2. The computer-readable medium of claim 1, wherein filtering the operation with the correlation filter further comprises:
    indicating that the reference to the migration unit is not correlated with the previous reference when the value in the data structure is not equal to the address of the migration unit.

3. The computer-readable medium of claim 2, further comprising:
    checking a timeout indicator of the data structure; and
    responsive to the setting of the timeout indicator, setting a value at each index of the data structure to a default value.

4. The computer-readable medium of claim 2, further comprising:
    checking a reset timeout value of an index of the data structure; and
    when the timeout value is exceeded, setting a value at the index to a default value.

5. The computer-readable medium of claim 2, wherein the migration algorithm migrates data between a faster component in the composite data storage system and a slower component in the composite data storage system.

6. The computer-readable medium of claim 2, wherein the data structure is a correlation array.

7. The computer-readable medium of claim 2, wherein the data structure is a linked-list data structure.

8. The computer-readable medium of claim 2, wherein the data structure is a probabilistic data structure.

9. A computer implemented method for managing a multi-device composite data storage system, the method comprising:
   detecting an input-output operation on the composite data storage system, the operation including a first reference to a physical data storage unit within a migration unit on the storage system, the migration unit comprising a plurality of physical data storage units;
   filtering, by a processor, the operation with a correlation filter to determine if the first reference is correlated with a second reference to a physical data storage unit within the migration unit;
   passing the operation to a migration algorithm when the operation is not a correlated reference, wherein the operation is not a correlated reference if the second reference is independent of the first reference; and
   indicating that the operation is not a correlated reference.

10. The method of claim 9, wherein filtering the operation with the correlation filter comprises:
    computing a hash of a migration unit address;
    reading a value at an index in a data structure, the index defined by the hash of the migration unit address; and
    when the value is not equal to the migration unit address, setting the value at the index of the data structure to the migration unit address.

11. The method of claim 10, further comprising:
    checking a timeout indicator of the data structure; and
    responsive to the setting of the timeout indicator, setting a value at each index of the data structure to a default value.

12. The method of claim 10, further comprising:
    checking a reset timeout value of an index in the data structure; and
    when the timeout value is exceeded, setting a value at the index to a default value.

13. The method of claim 12, wherein the data structure is a probabilistic data structure.

14. A machine-readable non-transitory storage medium containing executable instructions which, when executed, cause a data processing system to perform operations to managing a multi-device composite data storage system, the operations comprising:
    detecting a stream of input-output operations performed on the composite data storage system;
    filtering the stream of operations with a correlation filter before passing the filtered operations to a migration method, the filtering to remove correlated references from the stream of operations, wherein filtering the stream of operations comprises,
       identifying, in the stream of operations, an operation on a migration unit in a logical volume,
       computing a hash value of an address of the migration unit,
       indexing a data structure at an index defined by the hash value,
       comparing a value in the data structure, at the index specified by the hash value, to the address,
       removing the operation on the migration unit from the stream of operations if the value in the data structure is equal to the address, and
       setting the value in the data structure equal to the address if the value is not equal to the address.

15. The machine-readable storage medium of claim 14, further comprising;
    checking a timeout indicator of the data structure; and
    responsive to the setting of the timeout indicator, setting a value at each index of the data structure to a default value.

16. The machine-readable medium of claim 14, further comprising;
    checking a reset timeout value of an index in the data structure; and
    when the timeout value is exceeded, setting a value at the index to a default value.

17. The machine-readable medium of claim 16, wherein the data structure is a correlation array.

18. The machine-readable medium of claim 16, wherein the data structure is an ordered tree data structure.

19. A composite data storage system, the system comprising:
    a first data storage device, to store a set of migration units comprising one or more physical data storage units;
    a second data storage device, attached to the first data storage device, to store a set of migration units comprising one or more physical data storage units;
    a storage controller for the first and second data storage device, to store logical data units, the logical data units mapped to a physical data storage unit of the first device or the second device;
    a data migration processor to migrate frequently referenced migration units on the second data storage device to the first data storage device;
    a correlation filter, attached to the data migration processor and the storage controller, to filter correlated migration unit references from an input stream of the data migration processor wherein the correlation filter is further configured to:
    identify an input-output command referencing a migration unit on the first or second data storage device;
    examine an index in a probabilistic data structure with a hash value calculated from an address of the migration unit referenced in the input-output command;
    compare a value at the index in the probabilistic data structure to the address;
    populate the probabilistic data structure at the index with the address when the address is not equal to the value at the index; and
    filter the migration unit reference when the address is equal to the value at the index.

20. The system of claim 19, wherein the first and the second storage device together form a logical volume.

21. The system of claim 19, wherein the correlation filter is further configured to:
    reset the probabilistic data structure after a timeout.

22. A non-transitory computer-readable storage medium with instructions stored therein, the instructions, when executed by a processor, cause the processor to perform operations comprising the computer implemented method of claim 9.

* * * * *